May 1, 1956    W. C. OFFUTT ET AL    2,744,058
FLUIDIZED FIXED BED CATALYTIC PROCESS
Filed May 21, 1952
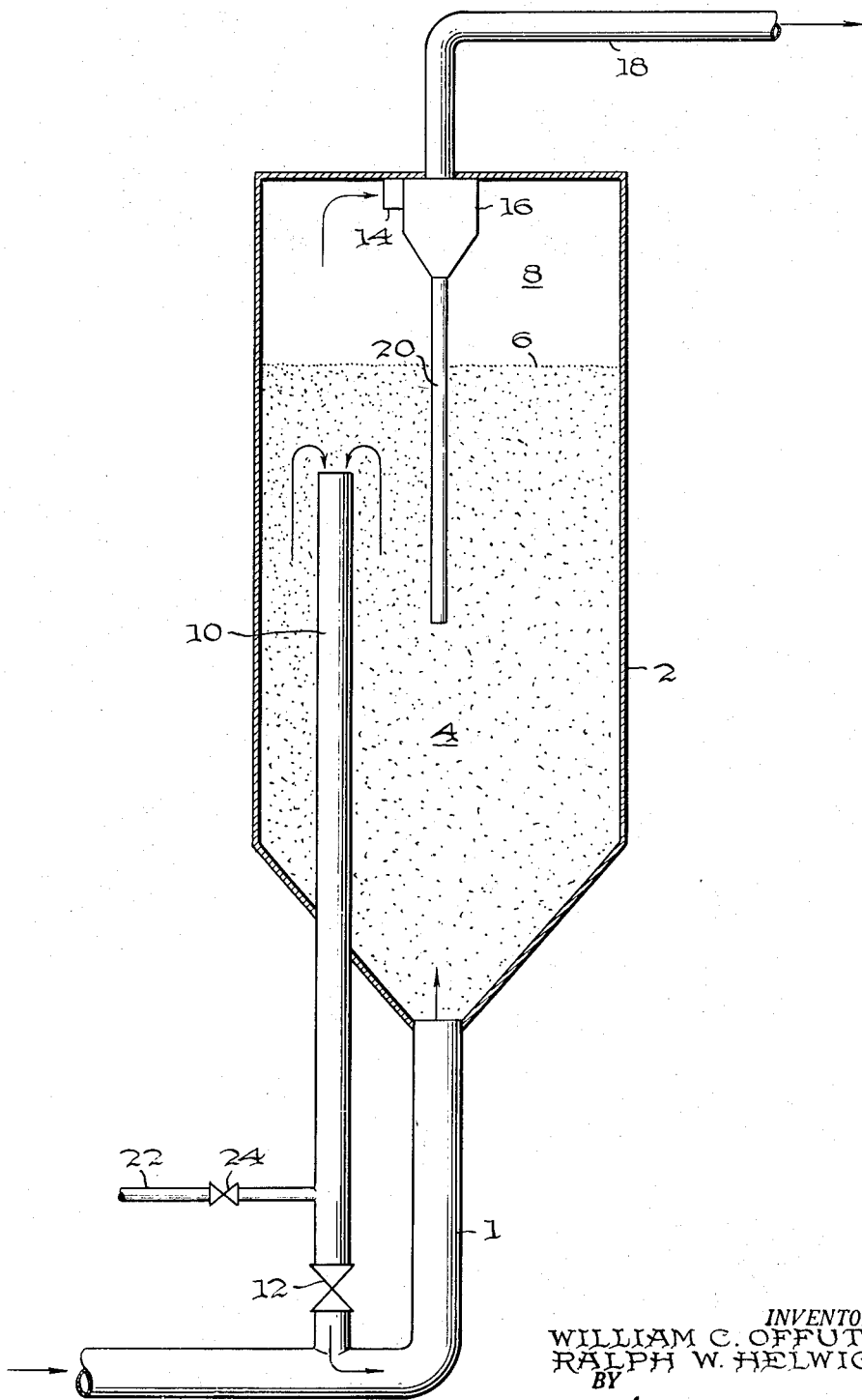
INVENTORS
WILLIAM C. OFFUTT
RALPH W. HELWIG
BY
THEIR ATTORNEY United States Patent Office 2,744,058
Patented May 1, 1956

2,744,058

FLUIDIZED FIXED BED CATALYTIC PROCESS

William C. Offutt, Edgewood, and Ralph W. Helwig, Oakmont, Pa., assignors to Gulf Research & Development Company, Pittsburgh, Pa., a corporation of Delaware Application May 21, 1952, Serial No. 289,106

2 Claims. (Cl. 196—53)

This invention relates to the fluidized fixed bed, catalytic treatment of partly vaporized high boiling hydrocarbon oils containing a substantial proportion of difficultly vaporizable, liquid phase material. More particularly, the invention relates to the improvement of avoiding catalyst clumping and "clinker" formation in a process of the type described, in which the clumping is due to over-wetting of the catalyst particles by the liquid portion of the feed.

Fluidized fixed bed catalytic operations differ from conventional, fluidized moving bed procedures in that catalyst is neither removed from nor added to the reaction in substantial amounts throughout the on-stream period, i. e., the same catalyst particles are utilized throughout the on-stream period without substantial intervening regeneration thereof. Thus the catalyst is utilized more nearly to the full extent of its activity. Generally, reactivation of the catalyst is carried out intermittently in the reaction vessel itself.

The fluidized fixed bed type of operation may be preferred over the conventional fluidized moving bed type of process where, for example, the catalyst retains its activity for a relatively long period of time, where the reaction being carried out possesses a neutral to exothermic heat balance, by reason of which it is unnecessary to supply large amounts of heat to the reaction zone by means of hot catalyst, and/or where it is inconvenient, due to the high pressure differential between the reaction zone and regeneration zone, to provide a continuous transfer of catalyst.

For some reactions, it may also be preferred to operate with low gas flow rates in the reaction zone. This may be desirable, for example, where the reaction is carried out at relatively high pressure.

In carrying out the low velocity, fluidized fixed bed catalytic conversion of high boiling hydrocarbon oils with normal feed injection methods, certain difficulties may be encountered. For example, direct injection of a partly vaporized heavy hydrocarbon oil feed containing substantial proportions of liquid material into a fluidized catalyst bed, may cause clumping or agglomeration of catalyst. Under certain conditions, for example, such as where a relatively large portion of the feed remains in liquid phase in the reactor for a relatively long period of time, where such feeds are introduced at too rapid a rate, and/or where such feeds are introduced into a relatively stagnant catalyst bed, i. e., one which has a poor rate or pattern of particle circulation, a situation may result within the reactor wherein the liquid portion of the feed is introduced onto the catalyst more rapidly than it is converted into vapors, for instance, by cracking or hydrogenation. When such conditions exist, the per cent of liquid on or in the catalyst continues to build up until the particles become over-wetted. Over-wetted catalyst particles tend to cohere to other catalyst particles. In this way agglomerates of catalyst may be formed.

Agglomerates of too large a size to be fluidized fall out of suspension and collect in the vicinity of the inlet. These stagnant agglomerates of catalyst tend to lose heat relatively slowly and thus may become heavily coked, with the result that "clinkers" are formed. These clinkers, or catalyst agglomerates, interfere with proper fluidization and reduce conversion. Also, runaway temperatures may be encountered in the regeneration of an agglomerated bed; such temperatures may cause damage both to the reactor and catalyst.

Non-uniform fluidization in the vicinity of the reactant inlet may also cause slurrying of the oil and catalyst, and the formation of a liquid level. This may lead to plugging of the reactor which entails extensive maintenance expenses and long off-stream periods.

Agglomeration of catalyst due to over-wetting may be controlled by reducing the rate at which the feed is introduced into the catalyst bed, or alternatively, by utilizing a diluent gas in a quantity sufficient to increase the gas: liquid ratio of the feed. Each of these expedients, however, results in lower space velocities and therefore lower yields per unit time.

It is an object of this invention to overcome one or more of the foregoing difficulties. It is a prime object of this invention to provide a fluidized fixed bed catalytic process in which a hydrocarbon oil containing substantial amounts of liquid phase material is converted, and wherein clumping of catalyst due to the over-wetting by the liquid portion of the feed is avoided or substantially alleviated. A more limited object is the provision of a fluidized fixed bed catalytic destructive hydrogenation process in which a low velocity flow of fluidizing gas is employed in the reaction zone, in which hydrocarbon oils of the type described are converted and in which agglomeration of catalyst due to over-wetting by the oil is avoided. Another object is to accomplish the foregoing objects without decreasing the space velocity.

These and related objects are accomplished by our invention which involves a fluidized fixed bed catalytic process carried out in the presence of a dense phase bed of fluidized catalyst in a reaction zone maintained at an elevated temperature sufficient to effect a reaction, wherein a mixed-phase, hydrocarbon oil feed containing a substantial proportion of difficultly convertible, liquid phase material is converted. The invention involves, in combination with the above, the improvement comprising avoiding clumping of catalyst due to over-wetting thereof by the difficultly convertible, liquid portion of the feed, by the steps of removing catalyst from the reaction zone and introducing it directly into the feed in a transport zone prior to entry of the feed into the reaction zone. The introduction of catalyst into the transport zone is effected at a rate sufficient to maintain a catalyst to oil ratio therein of between about 2:1 and about 50:1. The gas velocity in the transport zone is substantially greater and the density of the catalyst-feed mixture in the transport zone is substantially less than the velocity and density in the reaction zone. The liquid portion of the feed is thereby distributed over a relatively large quantity of catalyst. The feed and catalyst are then passed from the transport zone into the dense phase, fluidized catalyst in the reaction zone.

In the accompanying description and drawing certain preferred modifications of the invention have been described. It is understood that these embodiments are by way of illustration only and are not to be considered as limiting.

Referring briefly to the attached drawing, there is shown in schematic form a preferred apparatus for carrying out the process of this invention.

The operation of the invention may be best understood by more particular reference to the drawing. As applied, for example, to the fluidized fixed bed catalyst destructive hydrogenation of heavy hydrocarbon oils, a feed comprising a preheated and compressed mixture of hydrogen and a partially vaporized heavy hydrocarbon oil is introduced into the system through line 1. Catalyst is continuously withdrawn from the upper portion of the dense phase fluidized catalyst bed 4 through standpipe 10 which serves to conduct the catalyst removed from the reaction zone into the feed line 1. The rate of catalyst withdrawal and introduction into the feed line 1 is controlled by means of valve 12. A stripping gas, such as hydrogen or steam, is introduced through line 22 and through valve 24 into the lower portion of standpipe 10. Hydrogen is the preferred stripping medium, since the reactive effect thereof produces cleaner catalyst for introduction into the feed line. The upward passage of this gas through the catalyst contained in standpipe 10 serves the function of stripping the catalyst as well as that of maintaining it in fluidized form to avoid bridging.

Catalyst passes at the rate regulated by valve 12 from standpipe 10 into feed line 1. It should be noted that the stripping gas is introduced into standpipe 10 at a rate sufficiently low to provide a quite dense suspension of catalyst. Preferably, this rate is just sufficient to prevent plugging of the pipe. Thus a "hydrostatic" or "fluistatic" head exists above valve 12. The rapid velocity of the feed stream through line 1 causes the density of the catalyst-feed mixture in that section to be relatively low. A pressure differential thus exists across valve 12 which is roughly proportional to the vertical height of the inlet line 1. It is this pressure differential which induces flow of catalyst into the feed stream.

The catalyst is introduced directly from standpipe 10 into feed or transfer line 1, i. e., the transport zone. The catalyst is introduced into the transport zone at a rate sufficient to maintain "dry" catalyst substantially in excess of the fresh oil in said transport zone. This expedient avoids building up a heavy liquid concentration on any portion of catalyst.

The relatively high gas velocity in the transfer line 1 and the relatively high pressure drop between the standpipe 10 and the transfer line 1 provide a high catalyst flow rate, thereby permitting maintenance of an excess of "dry" catalyst in the transfer line 1. The low density of the suspension in the transfer line 1 results from the relatively high gas velocity therein and is characteristic of a relatively high degree of turbulence. This high turbulence further assists in providing a more uniform distribution of feed over the available catalyst.

More particularly, the velocity of the gas and liquid flow through feed line 1 is a multiple of that produced in the reaction zone, while the density of the catalyst-feed mixture in feed line 1 is a fraction of that in the reaction zone. For example, the density of the catalyst-feed mixture in the reactor is normally greater than about 20 lbs./cu. ft. as compared to a density of about 2 lbs./cu. ft. in the feed line 1. The gas velocity in the reactor is at least sufficient to fluidize the catalyst (a fraction of a foot/second or more) as compared with more than about 12 ft./second in the feed line 1. These exemplary, approximate figures serve to illustrate the comparison between the two zones.

The mixture of catalyst containing the well distributed, difficultly convertible, liquid portion of the feed and the feed gases passes upwardly from line 1 into reactor 2 which contains the dense phase fluidized fixed bed of catalyst 4. The catalyst particles containing adsorbed liquid migrate from the vicinity of the feed inlet to other parts of the catalyst bed. Reaction products ultimately pass out of dense phase 4 through dense phase bed level 6 and into dilute phase 8. From the dilute catalyst phase the reaction products pass into opening 14 of cyclone separator 16, in which the bulk of entrained catalyst particles are separated from the reaction products. Reaction products substantially free from entrained catalyst pass out of the system through line 18 to conventional recovery equipment (not shown). The reaction pressure is maintained by suitable valve means (not shown) down stream of the reactor.

Catalyst separated from reaction products in cyclone separator 16 is returned to the dense phase catalyst bed 4 through dip leg 20.

As indicated above, the inlet of standpipe 10 is preferably positioned relatively high in the reactor in order to withdraw catalyst from the upper portion of the bed. The advantages for such an arrangement are believed to be peculiar to the type of process here involved. This will be seen from the fact that the problem concerned is one of over-wetting of catalyst particles by difficultly convertible, liquid portions of the feed. The placing of the standpipe inlet high in the catalyst bed allows a relatively longer period for the difficultly convertible material to be reacted into useful products, with the result that catalyst removed from the upper portion of the bed is in a relatively drier state. For the same reasons it is preferred to position the stripping gas inlet near the bottom of standpipe 10 in order to provide more thorough stripping and thus drier catalyst particles for introduction into feed line 1. In addition, a long standpipe containing a column of dense catalyst insures a uniformly positive flow into the feed line.

It is to be emphasized that the catalyst agglomerates referred to are those due to wetting of the catalyst surface by the viscous, difficultly convertible, liquid portions of the feed, as distinguished from the agglomerates caused by fusion of metallic catalyst fines sometimes referred to in the prior art. The amount of catalyst agglomerates produced by fusion of fines in processes involving this problem is relatively small, since the amount of fines produced for any given period in fluidized catalytic operation is only a relatively small fraction of the total catalyst employed, and the amount being fused is only a fraction of the catalyst fines produced. In contrast, the agglomerates produced by heavy liquid phase material may involve any of the catalyst particles, regardless of size, and may cause the entire reactor to become completely plugged in a matter of minutes. Because of the nature of the problems involved, it will be seen that the problem of catalyst agglomeration due to wetting of the catalyst particles by the difficultly convertible, liquid portions of the feed is one unique to the fluidized catalytic conversion of heavy hydrocarbon oils.

The destructive hydrogenation or hydrocracking of heavy hydrocarbon oils is accompanied by deposition on the catalyst particles of a carbonaceous material of a coke-like nature. Consequently, periodic revivification of the catalyst is generally desirable. Any known method of regeneration is satisfactory. According to a generally used method, catalyst regeneration is carried out by passing an oxidizing gas, such as air, in admixture with an inert gas, such as steam, through the reaction vessel itself. The carbonaceous deposits and other contaminants may be burned off in this manner, after which the processing phase of the cycle is begun again. Details of catalyst revivification are well known in the art and will not be discussed in detail, since they form no part of the invention.

The types of charge stocks contemplated for use in this invention are those hydrocarbon oils containing considerable proportions of difficultly convertible, liquid material at reaction conditions of temperature and pressure. By "difficultly convertible, liquid material" is meant high-boiling constituents which are not readily reacted off the catalyst to form vaporous products and which persist for some time in the liquid phase at reaction conditions. Specific examples of charge stocks which may be employed are total crude oils, topped or reduced crude oils or other hydrocarbon oil charge stocks containing substantial amounts of high boiling residual components.

The specific amount of the difficultly convertible, liquid material which may cause difficulty in normal operations varies according to such factors as the adsorptive power of the particular catalyst employed, the nature of the liquid, the rate at which the liquid is reacted off the catalyst and the gas : liquid ratio in the feed. Generally speaking, however, feeds containing less than about five per cent liquid give little or no difficulty with regard to catalyst agglomeration. The invention is therefore concerned primarily with feeds containing more than about this amount of liquid.

The invention is applicable to any fluidized fixed bed catalytic conversion where the feed contains a substantial proportion of difficultly convertible liquid material. It is particularly applicable to processes of this type which are carried out with a low superficial linear gas velocity, e. g., 0.3 ft./sec. or less, through the catalyst bed. By way of example the catalytic destructive hydrogenation of hydrocarbon oils, the catalytic non-destructive hydrogenation of hydrocarbon oils, and the catalytic cracking of hydrocarbon oils may be carried out according to this invention.

Catalysts which are contemplated in the process of the instant invention are those normally employed in connection with the particular reaction concerned. In a preferred reaction, the destructive hydrogenation of hydrocarbon oils, satisfactory catalysts are those containing group VI and/or VIII metals or compounds thereof, taken singly or in combination. The catalytic materials may be supported or unsupported by porous materials such as silica gel, alumina, silica-alumina composites, Filtrol, various acid treated clays, activated earths, alumina-silica composites, and the like. These supports may or may not possess catalytic activity of themselves. The catalyst particles are of a size normally employed in fluidized catalytic operations and which will remain fluidized at the velocities contemplated. More particularly, this particle size normally varies from about 100 to 400 mesh, with the majority of the particles being of a size of about 200 mesh.

The rate at which catalyst should be added to the feed stream varies according to the nature of the charge, the adsorptivity of the catalyst and the gas to liquid ratio in the feed. For the materials and conditions usually employed this rate is equivalent to that producing a catalyst:oil ratio in the transfer line of between about 2:1 and 50:1 by weight. Thus, the quantity of catalyst available for adsorption of feed is much greater according to the present invention than that available with direct injection methods.

The reaction conditions employed are those normally employed in the particular reaction being carried out. These conditions form no part of the invention and are well known in the art. Purely by way of example the invention is of value in connection with the destructive hydrogenation of heavy hydrocarbon oils at temperatures between about 750° F. and 950° F. and at pressures in the range of about 300 p. s. i. g. to about 2000 p. s. i. g. Hydrogen to oil ratios which may be employed in destructive hydrogenation are those between about 1000 and about 20,000 s. c. f./bbl. Lower ratios result in an unsatisfactory degree of up-grading of the charge, while substantially higher ratios are uneconomical. Space velocities employed vary from about 0.1 to about 5.0 volumes of oil per volume of catalyst per hour.

It is understood that certain variations may be made from the described modifications without departing from the spirit of the invention. Thus, regeneration may be carried out by oxidation or reduction in the reaction vessel itself or in a separate vessel, or not at all; also, the catalyst withdrawal standpipe may be made integral with the reactor. Although the invention has been described specifically in connection with the fluidized fixed bed hydrocracking of heavy hydrocarbon oils, it will be apparent to those skilled in the art that the invention is applicable to any reaction in which a hydrocarbon oil containing substantial amounts of difficultly vaporizable liquid components is charged to a fluidized fixed catalyst bed, and especially to such reactions in which low-velocity fluidizing gas flow is utilized in the reaction zone. Other means than those shown in the drawing may be utilized to withdraw catalyst from the reactor.

The invention is advantageous in that it enables the fluidized fixed bed catalytic conversion of high boiling hydrocarbon oils containing substantial amounts of difficultly convertible liquid components. These advantages are achieved without catalyst agglomeration due to wetting of catalyst, with longer on-stream periods, with lower coke formation, with lower gas formation and with a higher recovery of low boiling liquid hydrocarbons. The advantages are achieved without an undesirable decrease in the rate at which hydrocarbon oil feed is charged to the reactor.

What we claim is:

1. In a fluidized fixed bed catalytic destructive hydrogenation process carried out in the presence of hydrogen and in the presence of a dense phase fluidized bed of destructive hydrogenation catalyst contained in a reaction zone maintained at elevated temperature and pressure, wherein a predominantly gaseous, hydrogen and mixed phase hydrocarbon oil feed containing a substantial proportion of difficultly convertible, liquid phase material is charged to the bottom of the reaction zone, and in which a superficial linear gas velocity of less than 0.3 feet per second is employed in the reaction zone, the combination therewith of the improvement comprising avoiding clumping of catalyst due to over-wetting thereof by the liquid portion of the feed, by the steps of removing relatively dry catalyst from the upper portion of the dense phase fluidized catalyst bed, stripping the catalyst thus removed and introducing it directly into the feed in a transport zone prior to the entry of the feed into the reaction zone, the introduction of catalyst being effected at a rate sufficient to maintain a catalyst to oil ratio in the transport zone of between about 2:1 and about 50:1, the gas velocity in the transport zone being substantially greater and the density of the catalyst-feed mixture in the transport zone being substantially less than the velocity and density in the reaction zone, distributing the liquid portion of the feed over a relatively large quantity of catalyst, and then passing the feed and catalyst from the transport zone into the dense phase fluidized catalyst in the low gas velocity, high-density reaction zone.

2. In a fluidized fixed bed catalytic destructive hydrogenation process carried out in the presence of hydrogen and in the presence of a dense phase fluidized bed of destructive hydrogenation catalyst contained in a reaction zone maintained at elevated temperature of about 750° and 950° F. and at a pressure between about 300 and 2000 p. s. i. g., wherein a predominantly gaseous hydrogen-hydrocarbon oil feed containing more than about 5 per cent of difficultly convertible, liquid phase material is charged to the bottom of the reaction zone, the hydrogen:oil ratio being between about 1000 s. c. f./bbl. and about 20,000 s. c. f./bbl. and in which a superficial linear gas velocity less than 0.3 feet per second is employed in the reaction zone, the combination therewith of the improvement comprising avoiding clumping of catalyst due to over-wetting thereof by the liquid portion of the feed, by the steps of removing relatively dry catalyst from the reaction zone and introducing it directly into the feed in a transport zone prior to entry of the feed into the reaction zone, the introduction of catalyst being effected at a rate sufficient to maintain a catalyst to oil ratio in the transport zone of between about 2:1 and about 50:1, the gas velocity in the transport zone being substantially greater and the density of the catalyst-feed mixture in the transport zone being substantially less than the velocity and density in the reaction zone, distributing the liquid portion of the feed over a relatively large quantity of catalyst and then passing the feed and catalyst from the transport zone into the dense phase, fluidized catalyst in the low gas velocity, high-density reaction zone.

References Cited in the file of this patent

UNITED STATES PATENTS

| | | |
|---|---|---|
| 2,334,553 | Harding | Nov. 16, 1943 |
| 2,517,900 | Loy | Aug. 8, 1950 |
| 2,616,914 | Riblett | Nov. 4, 1952 |